United States Patent
Bennett (10) Patent No.: US 7,738,111 B2
(45) Date of Patent: Jun. 15, 2010

(54) ULTRAFAST CHIRPED OPTICAL WAVEFORM RECORDING USING REFERENCED HETERODYNING AND A TIME MICROSCOPE

(75) Inventor: Corey Vincent Bennett, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 216 days.

(21) Appl. No.: 11/823,420

(22) Filed: Jun. 26, 2007

(65) Prior Publication Data

US 2008/0152360 A1    Jun. 26, 2008

Related U.S. Application Data

(60) Provisional application No. 60/817,159, filed on Jun. 27, 2006, provisional application No. 60/817,172, filed on Jun. 27, 2006.

(51) Int. Cl.
*G01B 9/02* (2006.01)
(52) U.S. Cl. .................... 356/484; 356/450; 356/451
(58) Field of Classification Search ................ 356/450, 356/451, 484
See application file for complete search history.

(56) References Cited

U.S. PATENT DOCUMENTS 7,411,683 B2 * 8/2008 Dorrer ........................ 356/484

OTHER PUBLICATIONS

Corey V Bennett et al. "Principles of Parametric Temporal Imaging-PartII: System Performance" IEEE Journal of Quantum Electronics, IEEE Service Center, Piscata, NJ, US. vol. 36, No. 6, Jun. 2000—, XP011052434 ISSN: 0018-9797.

Bennett C V et al: "Up-conversion time lens demonstrates 12/spl times/magnification of 100 Gb/s data" Lasers and Electro-Optics Society Annual Meeting, 1994. LEOS '94. Conference Proceedings. IEEE Boston, MA, USA Oct. 31-Nov. 3, 1994, New York, NY, USA, IEEE, US, vol. 2, pp. 197-198, XP010220966 ISBN: 0-7803-147-0.

Christophe Dorrer, "Single-Shot Measurement of the electric field of optical waveforms by use of time magnification and heterodyning". Optics Letters/vol. 31, No. 4/Feb. 15, 2006. pp. 540-542. 2006 Optical Society of America.

C.V. Bennett, B.H. Kolner, Principles of Parametric Temporal Imaging I. System Configurations. Sep. 17, 1999. UCRL-JC-135815 Pt 1. pp. 1-8.

C.V. Bennett, B.H. Kolner, Principles of Parametric Temporal Imaging II. System Performance. Dec. 6, 1999. UCRL-JC-135815 Pt 2. pp. 1-8.

* cited by examiner

*Primary Examiner*—Hwa S. A Lee
(74) *Attorney, Agent, or Firm*—John P. Wooldridge (57) ABSTRACT

A new technique for capturing both the amplitude and phase of an optical waveform is presented. This technique can capture signals with many THz of bandwidths in a single shot (e.g., temporal resolution of about 44 fs), or be operated repetitively at a high rate. That is, each temporal window (or frame) is captured single shot, in real time, but the process may be run repeatedly or single-shot. This invention expands upon previous work in temporal imaging by adding heterodyning, which can be self-referenced for improved precision and stability, to convert frequency chirp (the second derivative of phase with respect to time) into a time varying intensity modulation. By also including a variety of possible demultiplexing techniques, this process is scalable to recoding continuous signals.

39 Claims, 7 Drawing Sheets

ULTRAFAST CHIRPED OPTICAL WAVEFORM RECORDING USING REFERENCED HETERODYNING AND A TIME MICROSCOPE

RELATED APPLICATIONS

This application claims the benefit of U.S. Provisional Application No. 60/817,159, filed Jun. 27, 2006, entitled "ULTRAFAST CHIRPED OPTICAL WAVEFORM RECORDER USING SELF-REFERENCED HETERODYNING AND A TIME MICROSCOPE" and U.S. Provisional No. 60/817,172, filed Jun. 27, 2006, entitled "TIME STRETCHED RADIATION DETECTION", which are incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a measurement method and system. More particularly, the present invention relates to a measurement method and system for capturing both the amplitude and phase temporal profile of a transient waveform or a selected number of consecutive waveforms having bandwidths of up to about 10 THz in a single shot or in a high repetition rate mode.

2. Description of Related Art

Continuous real time recording of ultrafast optical waveforms presents significant technical challenges for conventional electronic analog-to-digital converter (ADC) technology. In general, there are two ways to record such transient waveforms: 1) increase the electrical bandwidth and sample rate, or 2) sample the waveform repetitively. In the latter method for example, ultrafast waveform events are reproduced and sampled repetitively. Samples from different reproductions are combined to reconstruct the waveform. The reproduced displayed waveform is therefore made up of many acquisitions of the signal, similar to that of an analog sampling oscilloscope. This technique does not work for single-shot signals. In the former method, the most obvious way to obtain more samples on the waveform is to increase the sample rate by using faster analog-to-digital converters. However, a typical commercially available state-of-the-art real-time oscilloscope has a resolution on the order of about a 18 ps step response (20 GHz analog bandwidth) and a 20 ps sampling period (50 Gsample/s), making such oscilloscopes undesirable for measuring certain optical waveforms, such as single-shot transient signals, when the desired resolution (step or impulse response duration referred back to the input) requires, for example, a temporal resolution from about 1 ps down to below 100 fs.

Other high-speed detection instruments based on electron streak tubes exist. Unfortunately, these instruments are fundamentally single shot, with a limited record length and slow read out and repetition rate. Such instruments also face space-charge effects which severely limit the usable dynamic range to less than 3.3 bits for 1 ps pulses.

There are also a number of ultrafast pulse measurement techniques, such as, Frequency Resolved Optical Gating (FROG), Spectral Shear Interferometry, correlation techniques, and variations on these, which work well to measure the shape of less than 100 fs pulses. However, such systems and methods have all been demonstrated as scanned systems, which requires a repetitive waveform, or in single-shot systems, which can only record with limited time-bandwidth products. In addition, in the case of single-shot FROG, or other similar systems that map the signal into space, frame capture rates are generally limited by slow readout camera technology.

It should be noted that there are also time stretching concepts related to but dissimilar from the true temporal imaging embodiments discussed herein. One such related technique does not have an input dispersion before the signal is mixed, typically electro-optically with a Mach-Zehnder modulator, with the chirped time lens signal. It has demonstrated large time magnification and fast sampling of electrical waves, but it is limited in the minimum impulse response duration by its GHz bandwidth opto-electronic time lens process and an inherent dispersion penalty which blurs the signal and produces fades in the frequency response. Likewise earlier true temporal imaging systems using electro-optic lenses to impart a frequency chirp are also limited in bandwidth, and thus temporal resolution. In contrast, the novel all optical system presented herein can have many THz of bandwidth and does not have an inherent dispersion penalty.

Accordingly, a need exists for methods and apparatus that can measure ultrafast optical waveforms with a temporal resolution from about 1 ps down to below 100 fs of impulse response width in an expedient and efficient manner. Such a system can record in a single-shot window in time with ultrafast resolution and can be performed at a high repetition rate. Such a technology, combined with one of many demultiplexing techniques, can be used to develop a continuous, greater than THz bandwidth, real time oscilloscope. The present invention is directed to such a need.

SUMMARY OF THE INVENTION

Accordingly, the present invention is directed to a self-referenced time lensing method that includes: providing one or more desired signals; providing one or more chirped time lens pump pulses to optically mix with the one or more desired signals; temporally magnifying the optically mixed one or more desired signals; and measuring a time-scaled replica of intensity and/or frequency information of the one or more desired signals with a temporal resolution of down to about 44 fs with waveform fidelity, precision, and dexterity better than about 5%.

Another aspect of the present invention is directed to a self-referenced time microscope configured to provide a time-scaled replica of the intensity and/or frequency information contained in one or more received desired signals.

Still another aspect of the present invention is directed to a heterodyning self-referenced time microscope recording system configured to provide as well as record a time-scaled replica of the intensity and/or frequency information contained in one or more received desired signals.

Accordingly, the present invention provides optical and THz arrangements and methods for capturing both the amplitude and phase of an optical waveform by adding heterodyning, which may as one arrangement, be self-referenced, to convert frequency chirp into a time varying intensity modulation to enable the measurement of one or more heterodyne beat frequencies of up to about 10 THz that change on about a 1 ps time scale. By also including a variety of possible demultiplexing techniques, such a process is also scalable to recoding continuous signals.

It is to be appreciated that the methods and apparatus of the present invention are further adapted to simultaneously convert the carrier frequency of a signal from one region of the electromagnetic spectrum to another. Applications include, but are not limited to: recording of signals that requires below about 1 ps impulse response temporal resolution; high-energy physics and high-energy density physics experiments; the study of ultrafast molecular dynamics; sub-diffraction-limit imaging (e.g. synthetic aperture imaging and inverse synthetic aperture imaging); and in ultra-wideband optical communications.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

General Description

The present invention is directed to a time-domain approach in which the entire spectrum is processed and captured collectively. Thus, the present invention provides a time-domain measurement system and method which can capture both the intensity profile and the frequency chirp of a transient optical or THz waveform or waveforms having a high repetition rate in a single shot format. Specifically, the methods and apparatus of the present invention are adapted to simultaneously convert the carrier frequency of a signal from one region of the electromagnetic spectrum to another. This may be from one optical band to another, or between THz and optical bands, or between any other bands between which sum-frequency-generation (SFG), difference-frequency-generation (DFG), or coherent higher order mixing process is possible. As long as the required dispersion can be produced at what ever the local carrier frequency is, temporal imaging can be achieved while simultaneously converting the signal from one spectral region to another.

Such a method and system, as disclosed herein, are fundamentally different than frequency domain approaches that capture a wideband signal only after it has been sliced into many narrow channels. Instead of trying to record the ultrafast waveform(s) directly, embodiments of the present invention utilize photonic processing to transform a desired signal into a format compatible with conventional high-speed electronic recording systems.

Such a method and system, as disclosed herein, are also fundamentally different than other time stretching systems which do not have an input dispersion and do not balance the input, output, and focal dispersions according to an imaging condition. The temporal imaging in this system does not suffer from fades in the frequency response, nor introduce phase shifts between frequency components, which blur the impulse response. The temporal imaging system(s) and method(s) of the present invention are capable of fs impulse response, referred back to the input, and when combined with heterodyning can record heterodyne beat periods on this time scale.

To determine a frequency chirp, the desired signal is mixed with a narrow band reference signal, for example a single longitudinal mode, which is directed from a separate or the same optical source from which the signal was generated, thus producing a heterodyne beat signal or a self-referenced heterodyne beat signal at the instantaneous frequency difference between the desired signal being recorded and the reference frequency. When utilizing a reference frequency derived from the source laser system, spectral components are locked in phase by the lasers mode-locking process and any frequency drift in the signal is tracked by the same drift in the reference. As another arrangement, a non self-referenced, heterodyne reference laser can also be used, but in such a case the phase of the beat signal drifts at a rate inversely proportional to the linewidth of the reference laser. It is to be appreciated that such a heterodyne beat is dramatically different from conventional heterodyning not only in terms of the higher frequencies being measured (up to about 10 THz instead of below about 20 GHz), but also in terms in the speed at which this beat is changing (on a ps time scale instead of slower than about 1 ns). It is also to be appreciated that such a beat signal is beyond the speed of real-time digitizers for recordation purposes. Therefore, to record either the beat signal or the original intensity profile of the ultrafast optical waveforms, such waveforms are magnified in time using techniques described herein, which enables such waveforms to maintain their shape on a transformed time scale and enables such magnified waveforms to be recorded with conventional high speed electronics with the benefit of having a system input resolution determined primarily by the ultrafast optical front end.

Figure 1:
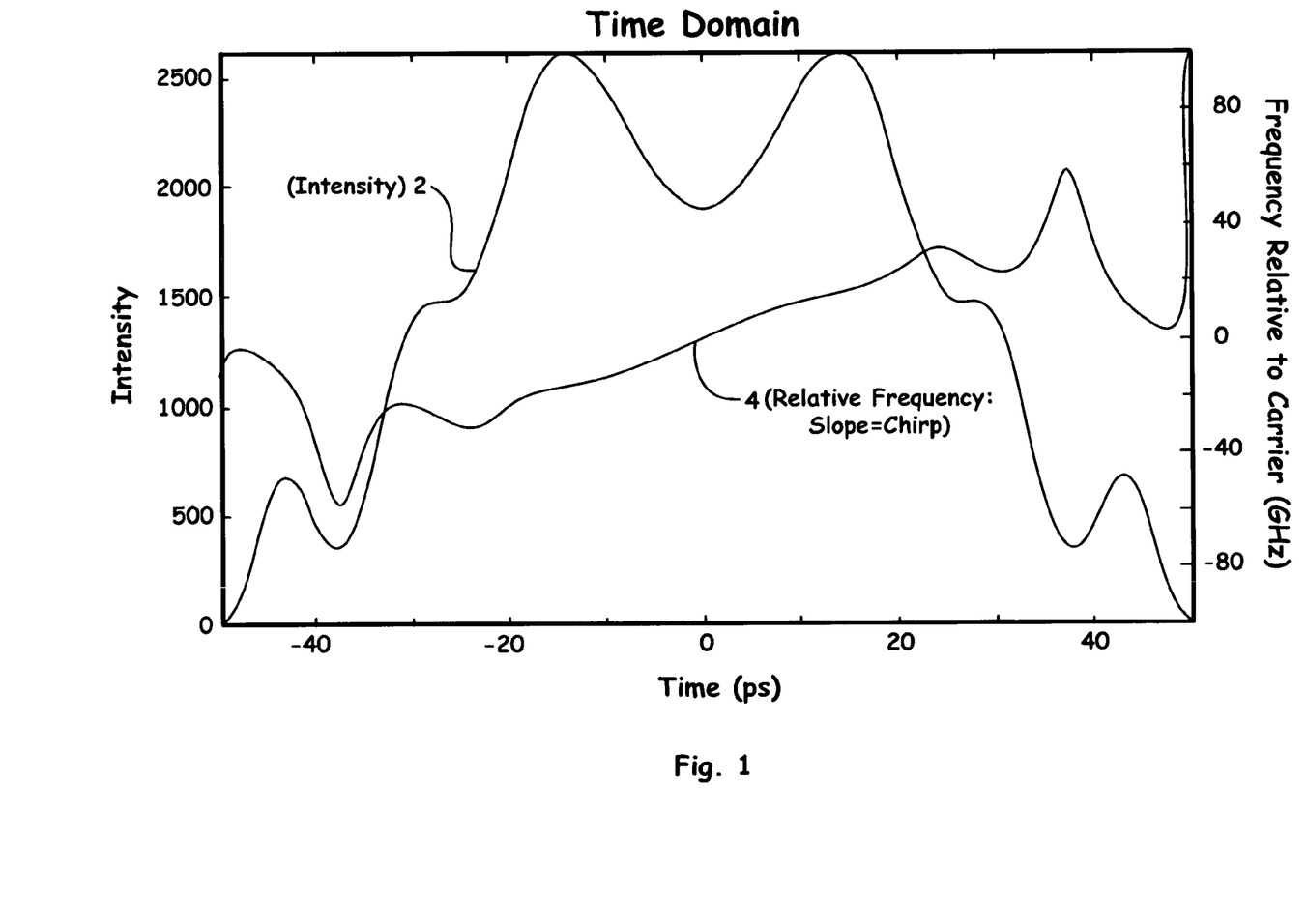
FIG. 1 shows an example time domain plot of a pulse intensity and frequency chirp for the present invention.

Accordingly, using hardware and techniques of the present invention, an input signal as illustrated in FIG. 1. can be recorded. The signal can be chirped to spread the spectrum and evenly fill a desired time frame, such as the 100 ps time frame illustrated in FIG. 1. By blocking the reference signal (e.g., the narrow band reference), a temporal image of an input optical intensity waveform 2 (as indicated by the left vertical axis) can be recorded. By not blocking the reference, a temporal image of a chirped beat which changes at the same rate as the chirp 4, i.e., the instantaneous frequency vs time information, as indicated by the right vertical axis) can be produced and recorded. Applicable bandwidths that can be resolved by the present application often include up to about 300 GHz, more often up to about 10 THz with down to about 44 fs resolution and with waveform fidelity (amplitude and phase uncertainty), precision (shot-to-shot waveform reproducibility), and dexterity (A-B-A-B reproducibility) better than about 5%.

Specific Description

Optical Principles

A) Ultrafast Optical Heterodyning

Given an input field $E_{in}(\tau)$ expressed in a reference frame where $\tau=0$ is the center of the pulse;

$$E_{in}(\tau) = A_{in}(\tau)\exp\left(i\left(\omega_0\tau + \frac{b\tau^2}{2} + \phi\right)\right) \quad (1)$$

where $A_{in}(\tau)$ is the amplitude profile, $\omega_0$ is the center carrier frequency, and b is the chirp parameter. The instantaneous frequency of the waveform is $\omega(\tau)=\omega_0+b\tau$. If this is added to the continuous wave field;

$$E_{ref}(\tau)=A_{ref}\exp(i\omega_{ref}\tau) \quad (2)$$

the resulting intensity profile is:

$$I_h(\tau) = |A_{in}(\tau)|^2 + |A_{ref}|^2 + 2A_{ref}A_{in}(\tau)\cos\left((\omega_0 - \omega_{ref})\tau + \frac{b\tau^2}{2} + \phi\right). \quad (3)$$

When the reference amplitude is close to that of the input amplitude, a strong beat is observed. When the beat is stronger than variations in the input amplitude profile a fit of the argument in the cosine to match the positions of the maxima and minima determines the chirp. It is to be appreciated that an exact match of the fringe amplitudes is not required to determine the chirp accurately. It is only necessary to match the beat oscillation frequencies. Higher order chirp curvature can also be included. In cases where there is strong modulation in the input amplitude $A_{in}(\tau)$, a separate recording (done simultaneously, as described below) of the input waveforms intensity profile can be used to determine the amplitude of the cosine term and produce a more accurate fit.

Many numerical techniques can be used to process the captured heterodyne beat signals and acquire the desired frequency vs time information (chirp). These include, but are not limited to, direct calculation of beat periods from maxima and minima, least mean squared error fitting, Fourier Transform processing, Wigner Transforming, Wavelet transforms, and Sonogram approaches.

Both the input intensity profile and beat signal described above are too fast to record with a conventional photodetector and electronic digitizer directly. The next sections describe how desired signals can be magnified in time by the present invention before recording.

B) Space-Time Analogy

The temporal magnification technique of the present invention is based on a space-time duality between how a beam of light spreads due to diffraction as it propagates in space and how pulses of light disperse (spread) as they propagate through dispersive media. As known to those of ordinary skill in the art, a variety of dispersive elements, such as, for example, prism systems, optical fiber, a non-linear crystal, a free space grating, a waveguide, an arrayed waveguide grating with feedback, a volume of dispersive material (e.g., gas, solid, or liquid), an array of ring resonators, a Gires-Tournois interferometer (GTI), a fiber Bragg grating, and/or a planar waveguide Bragg grating can all be used to generate dispersive delay lines and can thus be incorporated into the configurations and methods disclosed herein. Since the equations describing narrow-band dispersion have the same mathematical form as those for paraxial diffraction, dispersion can perform the role of diffraction in the temporal equivalent to an imaging system.

Figure 2A:
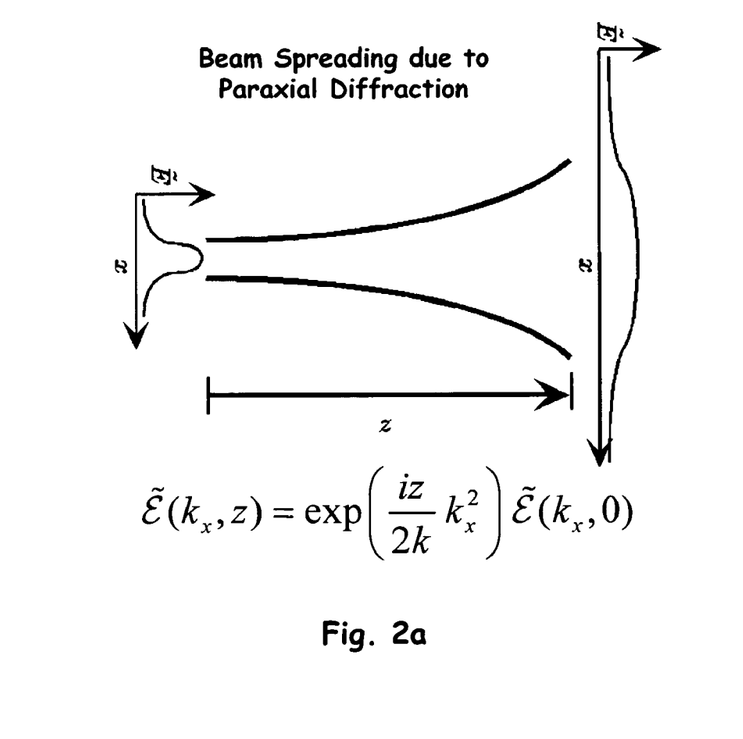
FIG. 2a illustrates beam spreading due to paraxial diffraction.
Figure 2B:
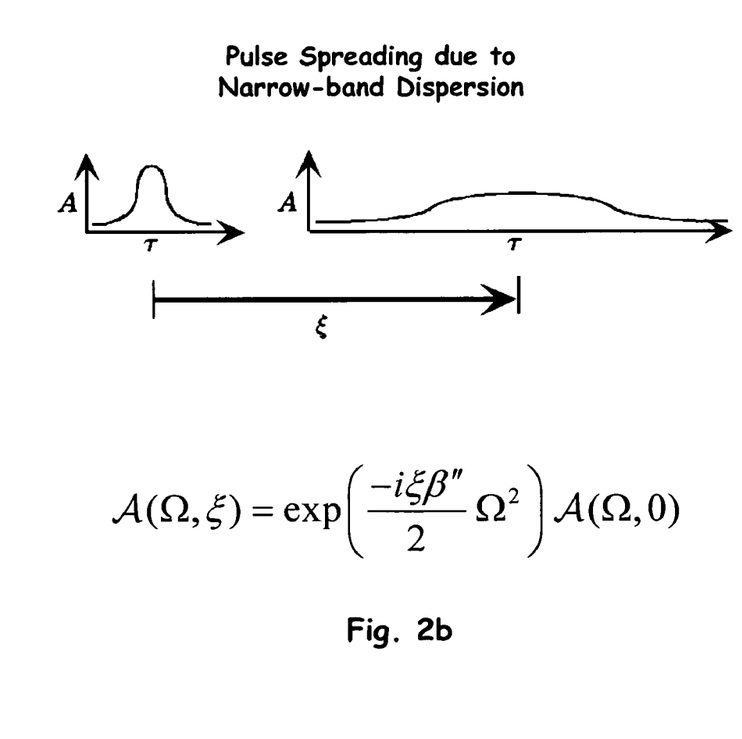
FIG. 2b illustrates pulse spreading due to narrow-band dispersion.

FIG. 2a and FIG. 2b illustrates the space-time duality described above, wherein the graphic in FIG. 2a shows the evolution of the transverse spatial field profile in x as it propagates in z, and FIG. 2b shows the temporal profile of a pulse as it spreads in the local time coordinate $\tau$ as it propagates the distance $\xi$. Both can be seen to impart a quadratic spectral phase to their respective frequency domains, $\tilde{\epsilon}(k_x,z)$ and $A(\Omega,\xi)$, where $k_x$ is a transverse spatial frequency component and $\Omega=\omega-\omega_0$ is an optical frequency component relative to the carrier. In space the strength of the diffraction depends on the distance z and the wavevector $k=2\pi n/\lambda$. In the time domain, the strength of the dispersion depends on the distance $\xi$ and the materials (or systems) group velocity dispersion (GVD) $\beta''=d^2\beta(\omega)/d\omega^2|_{\omega=\omega_0}$, or the total group delay dispersion (GDD) can be written $\phi''=\xi\beta''=d\tau_g(\omega)/d\omega|_{\omega=\omega_0}$. It should also be noted that combinations of different dispersive elements may be combined to cancel higher order dispersion (spectral phase terms), satisfying the narrow-band approximation even for extremely wide bandwidths.

Figure 3A:
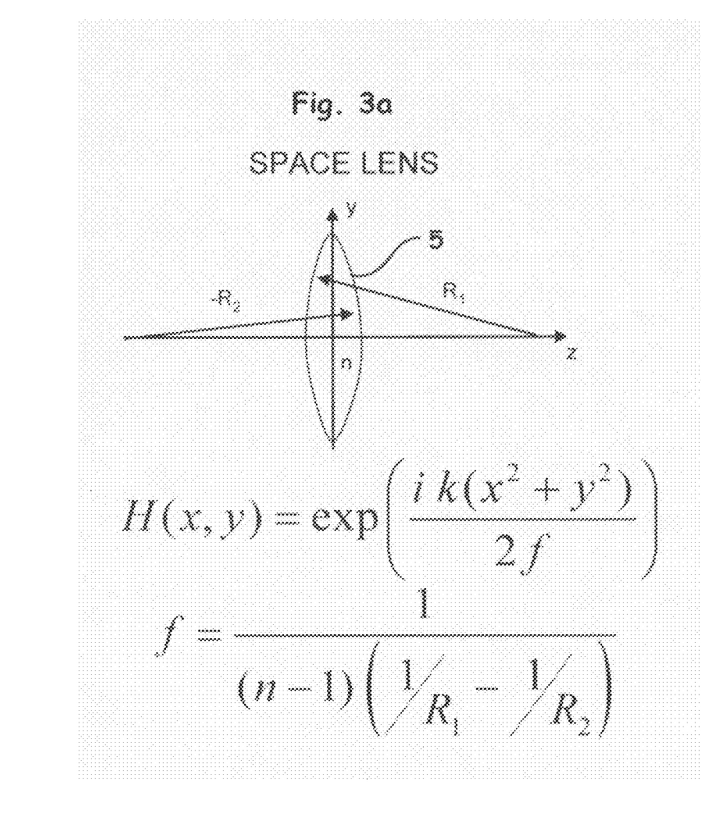
FIG. 3a illustrates a lens in space for comparison with the lens in time of FIG. 3b. Both impart a quadratic phase in their real space coordinate.
Figure 3B:
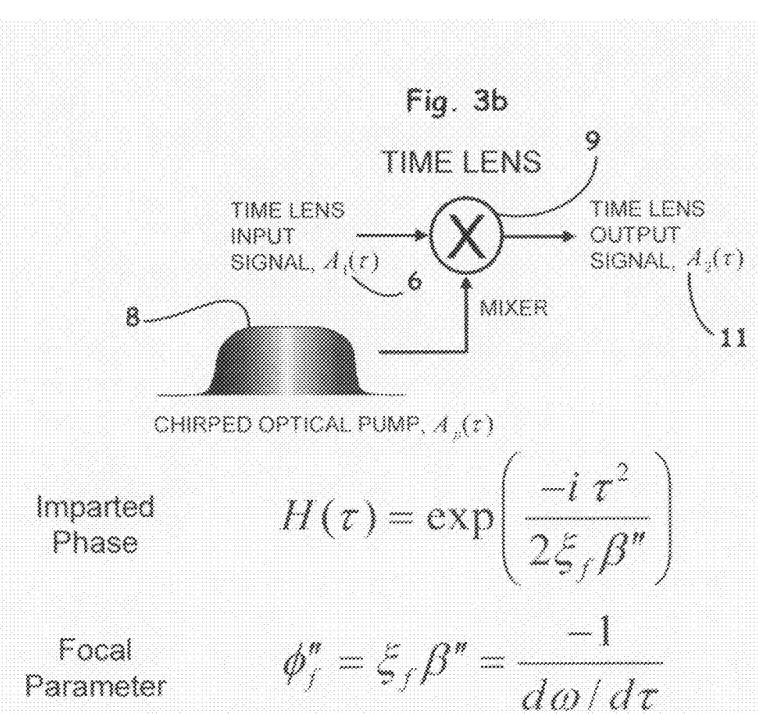
FIG. 3b illustrates a lens in time for comparison with the lens in space of FIG. 3a. Both impart a quadratic phase in their real space coordinate.

There is also a one-to-one analogy between the quadratic spatial phase modulation produced by a space lens 5, as shown in FIG. 3a and imparting of a quadratic temporal phase (equivalent to a linear frequency chirp), as shown by the time lens of FIG. 3b. Any process that can impart such a temporal phase profile can act as the time domain equivalent of a lens in space. Electro-optic and cross-phase modulation time lenses have been demonstrated, but they generate weak lenses with short time apertures and are thus not well suited to recording long waveforms with the novel ultra-fast detail of the present invention.

Accordingly, a time lens is implemented herein, as shown in FIG. 3b, through mixing of an input signal 6 with a broadband-chirped optical pump 8 to impart a quantity of quadratic phase curvature (equivalent to a linear frequency chirp). This mixing is generated through sum-frequency generation, difference-frequency generation, or higher order mixing process such as, but not limited to, four wave mixing of the input and pump signals in a nonlinear material 9 (e.g., GaSe, ZnGeP, GaP, LiNbO3, LiTaO3, PPLN, PPSLN, PPLT, PPSLT, KNbO3, LBO, BIBO, CLBO, KTP, GaAs, GaSe, ZnGeP, GaP, Si, Silica fibers/waveguides, doped fibers/waveguides and/or many other nonlinear materials). In space, those skilled in the art think of the focal length f for a refractive lens, as shown in FIG. 3a, as the propagation distance required after the lens, for plane wave illumination that removes the imparted phase curvature in order to focus the beam to a small spot. This focal length is defined in a material (often air) and at a wavelength which has the corresponding wavevector k.

Likewise, the temporal focal length $\xi_f$, as shown in the equations of FIG. 3b, is considered to be the propagation length required in a material (or system) with GVD, $\beta''$ after the time lens, for continuous wave input that removes the imparted phase curvature and thus compresses the light to short pulses. In systems where the GVD is constant, such as those using only one type of optical fiber, it is convenient to work with focal length parameter $\xi_f$ but in others it is simpler to just consider the total focal GDD $\phi_f''$, as shown in FIG. 3b.

C) Temporal Imaging of Optical Waveforms

Analogous to its spatial-counter-part, a system that can expand (or compress) arbitrary temporal waveforms is thus produced by cascading dispersive propagation, time lens modulation, and further dispersive propagation, in the proper balance according to the temporal imaging condition $$\frac{1}{\phi_1''} + \frac{1}{\phi_2''} = \frac{1}{\phi_f''}, \quad (4)$$

where $\phi_1''$ is the input GDD, $\phi_2''$ is the output GDD, and $\phi_f''$ is the focal GDD, respectively. The output waveform is then a temporally scaled replica of the input waveform, $$A_{out}(\tau) \propto A_{in}\left(\frac{\tau}{M}\right)\exp\left(\frac{-i\tau^2}{2M\phi_f''}\right), \quad (5)$$

with a magnification $$M = -\frac{\phi_2''}{\phi_1''}. \quad (6)$$

It is to be appreciated that if the GVD characteristics of the material is constant, such GDD ratios are reduced to ratios of propagation lengths, similar to spatial imaging. The magnification of the signal in time also reduces the bandwidth of each temporal feature (pulses), but the quadratic temporal phase in Eqn. (5) represents the fact that the chirp imparted by the time lens, divided by the magnification, remains in the temporal image. It is also to be appreciated that such a process is completely coherent, with both the input amplitude and phase profiles being scaled by the magnification.

With the definition of focal GDD, $\phi_f''=(-d\omega/d\tau)^{-1}$ as given in FIG. 3b, where $d\omega/d\tau$ is the time lens pump pulse chirp, the results above, strictly speaking, apply to the case of sum-frequency generation (SFG) time lens mixing. In the case of difference frequency generation (DFG) mixing, or higher order processes, the spectrum of the input signal may be inverted or the imparted chirp may have an opposite sign to that of the pump. Table 1 below outlines changes in the imaging condition, carrier frequency shift, and resulting magnification for the SFG and DFG cases.

The above are all $\chi^{(2)}$ nonlinear processes. It is also possible to create a time lens through coherent higher order processes, such as, but not limited to $\chi^{(3)}$. With a strong pump the Four Wave Mixing (FWM) process $E_2 \propto \chi^{(3)} \cdot E_p E_p E_1^*$ produces an output at carrier $\omega_2 = 2\omega_p - \omega_1$ and imparts twice the chirp rate of a DFG, Pump-Input case above. Two photons of the pump are combined with one photon from the input to produce one photon for the output instead of one photon from each being involved. In this case the factor of two on the imparted chirp and the complex conjugate of the signal change the imaging condition to $$\frac{-1}{\phi_1''} + \frac{1}{\phi_2''} = \frac{2}{\phi_f''}.$$

At this focusing condition the input field $A_{in}(\tau)$ will produce a complex conjugate and time magnified output $A_{out}(\tau) \propto A_{in}^*(\tau/M)$ when the magnification is $M=+\phi_2''/\phi_1''$. This is very similar to the case of DFG pump-input parametric temporal imaging except that the effective time lens strength is doubled (half the focal dispersion) and the frequency shift of the carrier is much less. A benefit of this type of time lens mixing is that it can be very efficient over a broad spectral band without the use of periodic poling. Fabrication tolerances in periodic poling can lead to ripple in the mixing conversion efficiency. This source of distortion does not exist in four wave mixing temporal imaging.

In an application where it's desirable for all signals to stay at a wavelength in the highly utilized telecom S-, C- and L-bands, where large volumes of components are produced and industry supports component development, this FWM time lens mixing configuration has the benefit of keeping the output signal in these bands if the input and pump are also in this band. In these bands large dispersion-to-loss ratios are available with specialty fibers. This alleviates the need for a chirped fiber Bragg grating at the output and removes distortions due to fabrication tolerance induced ripple in the grating delay and reflectivity.

The same physics which produces FWM also produces self phase modulation (SPM). This could distort the time lens pump pulse and cause aberrations in the system. This problem could be minimized my using a flat topped, or super Gaussian, intensity profile for the time lens pump. SPM induced distortions would occur on the edges of the time lens pulse and cause little to no effect in the center where most of the energy passes through the time lens process.

TABLE 1

| Time Lens Type | Output Carrier | Imaging Condition | Magnification | Image $A_{out}(\tau) \propto$ |
|---|---|---|---|---|
| SFG (or EO) | $\omega_2 = \omega_1 + \omega_p$ ($\omega_0$) | $\frac{1}{\phi_1''} + \frac{1}{\phi_2''} = \frac{1}{\phi_f''}$ | $M = -\frac{\phi_2''}{\phi_1''} = \frac{1}{1-(\phi_1''/\phi_f'')}$ | $A_{in}\left(\frac{\tau}{M}\right)$ |
| DFG, Pump-Input | $\omega_2 = \omega_p - \omega_1$ | $\frac{-1}{\phi_1''} + \frac{1}{\phi_2''} = \frac{1}{\phi_f''}$ | $M = +\frac{\phi_2''}{\phi_1''} = \frac{1}{1+(\phi_1''/\phi_f'')}$ | $A_{in}^*\left(\frac{\tau}{M}\right)$ |
| DFG, Input-Pump | $\omega_2 = \omega_1 - \omega_p$ | $\frac{1}{\phi_1''} + \frac{1}{\phi_2''} = \frac{-1}{\phi_f''}$ | $M = -\frac{\phi_2''}{\phi_1''} = \frac{1}{1+(\phi_1''/\phi_f'')}$ | $A_{in}\left(\frac{\tau}{M}\right)$ |

In an ideal system, the ultimate limit to the input resolution of a system as disclosed herein having a large magnification is the duration of the pump pulse if it is transform limited instead of chirped; e.g., if the pump pulse (e.g., having a configured flat top or super-Gaussian time lens pump pulse intensity profile) has a bandwidth of a 25 fs pulse and everything else is ideal, then the temporal imaging system equates to an input resolution limit of 25 fs. The derivation of this assumes a Gaussian time lens aperture and defines two elements as being resolved when they are separated in time by the duration of the systems impulse response. Thus, if the input waveform has the same bandwidth as the time lens pump, the field of view (temporal record length) is approximately the duration of the chirped pump pulse. The number of resolvable points is therefore given by the time lens pump pulses stretch factor, the chirped pump's duration over its transform limited duration. The present invention also includes filtering effects due to the transmission of various optical components and group velocity mismatch in the nonlinear crystal. These filtering effects can both reduce the aperture time and blur the image, depending on their location in the system.

Efficient conversion requires phase matching of all frequency components in the input 6, pump 8, and output 11 signals. In the presence of group velocity mismatch and group velocity dispersion, this can be difficult to do over a broad bandwidth. The crystal 9 is typically required to be shorter than in narrower band applications, also reducing the efficiency. Both the input waveform 6 and pump pulse 8 are dispersed (e.g., via, for example, Fiber Bragg Gratings, or wound optical fibers) to obtain the desired time lens phase profile and to focus the imaging system, thus their peak intensities are reduced. These conditions are all contrary to those desired for good conversion efficiency. For a given energy of the time lens pump pulse this results in a fundamental trade off between conversion efficiency in the crystal (and thus system loss) and the maximum per pump pulse input time aperture (frame length). The present invention provides solutions using higher energy pump lasers and optical amplification. Another example arrangement is to reduce the input time aperture per pump pulse and run the system at a higher repetition rate.

Yet another solution is to utilize quasi-phase matched nonlinear materials such as, but not limited to, periodically poled lithium niobate (PPLN) and aperiodically poled lithium niobate (A-PPLN). Much higher effective nonlinear susceptibility can be achieved with these devices than in bulk crystals. The poling period can also be chirped to obtain higher conversion efficiency in different parts of the device for different wavelength ranges, thus improving the overall efficiency across the entire bandwidth. Waveguides can also be written into such PPLN devices. This maintains a tighter mode confinement over a longer interaction length, also increasing the conversion efficiency.

Figure 4:
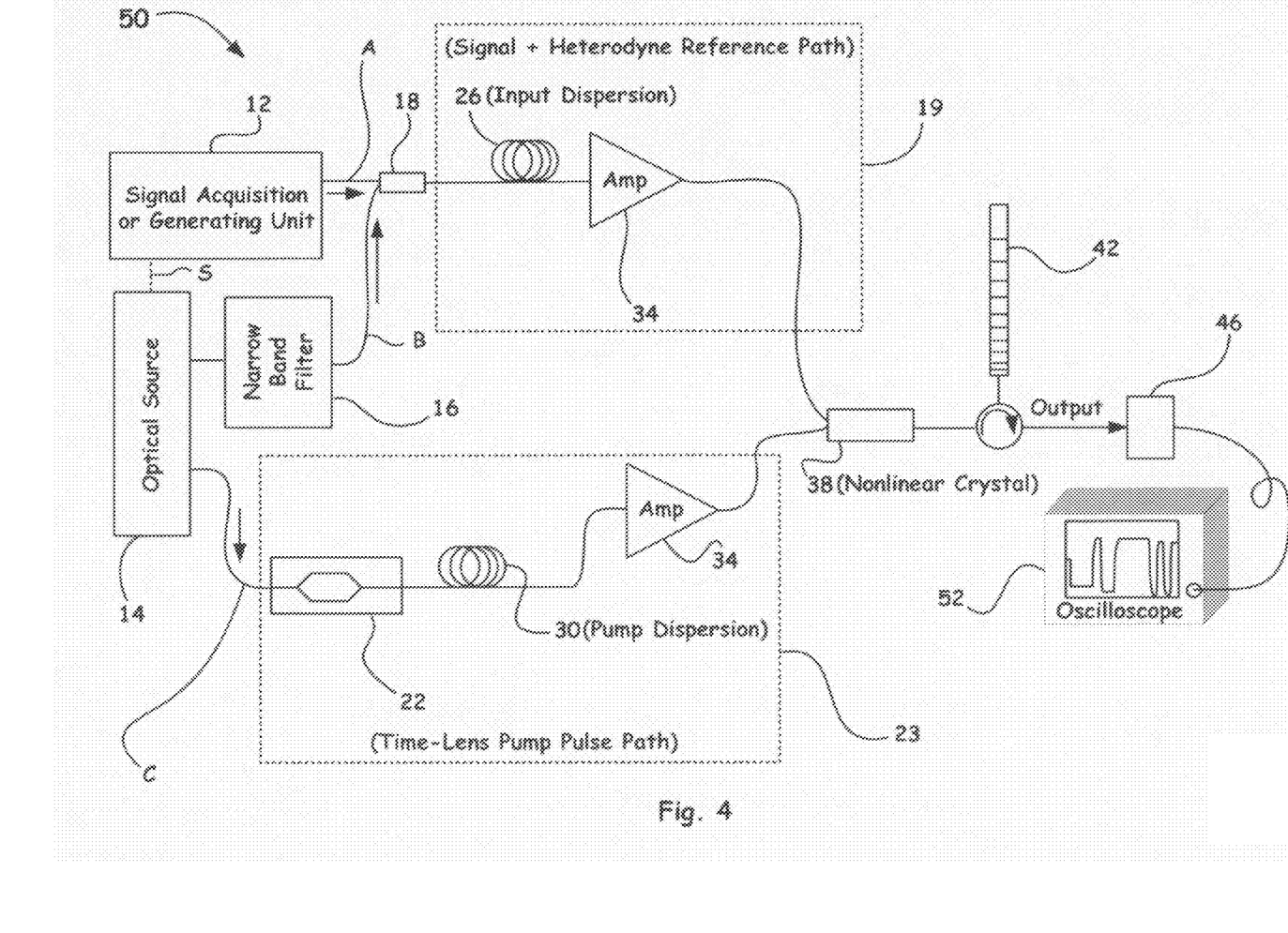
FIG. 4 shows an example self-heterodyne and temporal imaging diagram of an ultra-fast chirp pulse recording system of the present invention.

Turning back to the drawings, a diagram that illustrates an exemplary embodiment of a system having an input signal sensitivity from about 5 pJ down to about 5 fJ per 100 ps input frame (temporal field of view), or about 50 mW down to about 50 μW peak optical power, as constructed in accordance with the present invention, is shown in FIG. 4. The system, designated generally by the reference numeral 50, and capable of being designed as a portable compact apparatus, generally includes a signal generation or acquisition unit 12, an optical source 14, a fiber coupler 18, a pulse picker 22, as well as a first 26 and a second 30 optical dispersion element (such as, for example, a chirped fiber Bragg grating (used in reflection with an optical circulator or fiber coupler), or a prism or grating pair system. However, while such optical dispersive elements are beneficial, the present invention can also utilize any dispersive material that can induce the proper amount and kind of dispersion required for the present application, such as, for example, a configured pair of wound optical fibers to induce a predetermined dispersion effect.

System 50 also includes a pair of optical amplification means 34, such as, but not limited to, Erbium doped Fiber amplifiers, a nonlinear interaction optical device 38, such as, but not limited to, a periodically poled Lithium Niobate waveguide or an aperiodically poled lithium niobate (A-PPLN) as discussed above, an output dispersion means 42 (e.g., wound optical fiber, prism or grating pair systems, dispersive material, but often a chirped fiber Bragg gratings used in reflection with an optical circulators or fiber coupler, etc.), a detector 46, such as, for example, a photodiode, an amplified photoreceiver, a photomultiplier, a charge coupled device (CCD), etc., and/or any imaging device constructed to the design output parameters for system 50, and an analyzing means 52, such as a real-time oscilloscope, for analyzing the time magnified waveforms as received by detector 46. Other components can replace one or both of 46 and 52, such as optical streak cameras, with significant trade offs in the bandwidth, dynamic range, and repetition rate of the system.

The signal generation or acquisition unit 12 is configured to either receive a single-pulse transient signal or a number of such pulses or is configured to generate said waveform from the optical source 14. It may be configured to induce the received modulation onto a reference signal directed from optical source 14 (as shown by the dashed path denoted by the letter S) or directed from a separate independent source) via for example, an integrated-waveguide interferometric modulator (e.g., a LiNbO3 Mach-Zehnder modulator), or modulating sensor unit. It may also be designed to generate ultrafast arbitrary waveforms from said source 14, which require real-time measurement and verification as to their precision, accuracy, and stability. The optical source 14 itself is often designed to be a laser, often a mode-locked laser, arranged to output about 100 mW of average optical power and capable of outputting a wavelength range between about 800 nm and up to about 2 micron, more often between about 1310 nm and up to about 1650 nm so as to also include the S, C, and L bands commonly utilized in the telecom industry. Many other wavelength bands may also be used. While a number of optical sources can be incorporated into the present invention, a beneficial source includes a mode-locked Pritel model UOC laser system lasing at 1534 nm at 620 MHz with output pulse-widths of down to about 1 ps. Another beneficial arrangement for the optical source 14 includes integration of an octave spanning carrier-envelope locked system currently under development at Massachusetts Institute of Technology (MIT). In such an arrangement, signal and pump pulses can be chosen from slightly shifted sections of the broadband laser.

While source 14 shows one common source for improved stability, it is also possible for separate and varied types of sources to be used. For example, a narrow line-width (e.g., 1 MHz or less) Distributed Feedback laser (DFB) laser, or tunable single-longitudinal optical sources, such as, but not limited to, Distributed Bragg Reflectors, Sampled Grating DBRs, Grating-assisted Co-directional Couplers with Sampled Reflectors, and Vertical Cavity Surface Emitting Lasers capable of operating within the designed parameters may also be utilized when operating within the scope and spirit of the present invention. Narrow band sources can be used as the heterodyne reference or be modulated by an ultrafast event as part of signal generation or acquisition unit 12. The time lens pump pulse is required to have a broad bandwidth in order to obtain good temporal resolution. A broadband modelocked laser source can be used directly or narrow band sources as mentioned earlier can be modulated with high speed amplitude and phase modulators to spectrally broaden the signals. In addition, example arrangements with such sources as disclosed herein also include utilizing solution compression in dispersion-decreasing fiber to simultaneously broaden the bandwidth and shift the wavelength (e.g., to shift from 1534 nm to 1558 nm) of a chosen pump signal to preclude deleterious effects, such as degenerate collinear sum-frequency mixing in the non-linear crystal embodiments of the present invention. Other nonlinear processes such as self phase modulation may also be used to broaden the spectrum of the pump signal.

Turning back to FIG. 4, in the method of the invention, a desired waveform to be recorded (not shown) is generated by the signal generation or acquisition unit 12. It may be by way of an induced modulation of an electromagnetic radiation beam directed from optical source 14 (as denoted by the dashed path line S), or by an ultrafast modulation of an independent source. The induced modulated signal as produced from signal generation or acquisition unit 12 is directed along path A (shown with a directional arrow). A narrowband reference signal (preferably generated from optical source 14 in conjunction with a filtering means 16 (e.g., one or more narrow band filters, edge filters, long pass and short filters, etc.)) is directed along path B (shown with a directional arrow) for use in heterodyning (via optical coupler 18) with the induced signal directed along path A. Upon heterodyning, the resultant signal is further directed to the Signal & Heterodyne reference path 19 (as shown by the dashed box), which includes being directed through optical dispersive element 26 to induce a predetermined amount of dispersion into the signals received from optical coupler 18. Thereafter, the heterodyned signal is amplified via amplifier 34 to make up for losses resulting from upstream elements.

A third signal directed along path C (also denoted with an accompanying directional arrow) includes a broadband pulse also generated from optical source 14 and is directed to the time-lens pump pulse path 23 (also shown with a dashed box). As shown within the time-lens pump path 23, a pulse picker 22, such as a Mach Zehnder modulator or any electro-optic modulator or acousto-optic modulator having a suitable electronic driver, is configured in the pump pulse path of the example embodiment for system 50 to reduce the rate of the time lens pump thereby causing, for example, only 1 out of 4 (rate adjustable) of desired input signals to be up-converted and recorded at the output. The three dispersive delay lines in the system are adjusted according to temporal imaging conditions as per equation 4, as discussed above, to focus the system and produce a time-scaled replica at the output of the waveform at the input with, for example a suitable temporal magnification of up to about +/−100×. The nonlinear interaction optical device 38 is configured to impart the chirp of the time lens pump thereby generating a time lens. The FBG/Circulator (or directional coupler) configuration imparts the image dispersion and the time magnified signal is received by detector 46 and captured by an available scope capable of resolving such magnified images of the present invention.

The present invention will be more fully understood by reference to the following examples, which are intended to be illustrative of the present invention, but not limiting thereof.

Figure 5:
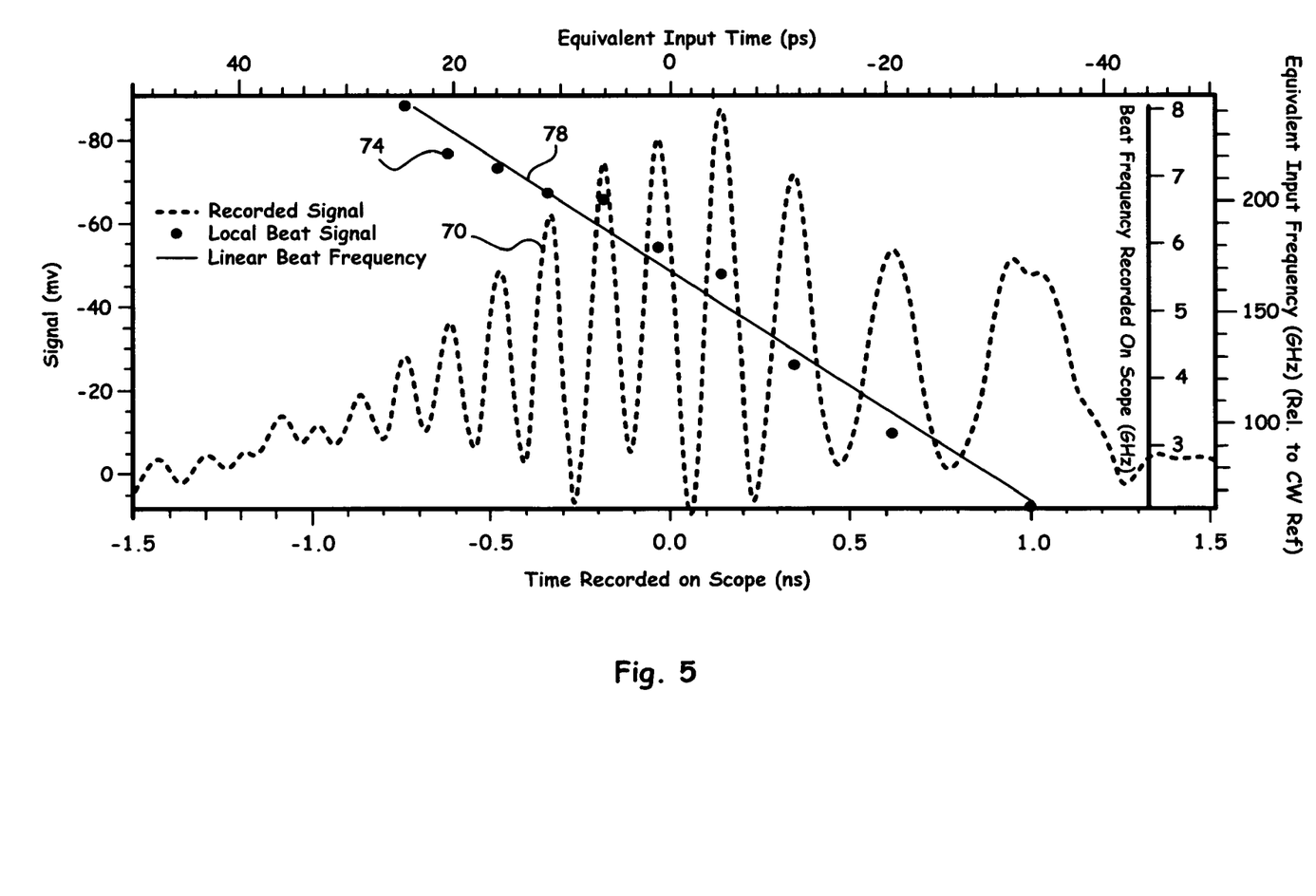
FIG. 5 show results for a chirped 1.8 nm FWHM input pulse at 1534.0 nm (229 GHz FWHM bandwidth) as produced by configurations of the present invention.

FIG. 5 shows results for a recorded chirped 1.8 nm FWHM input pulse 70 (shown as a dashed line) at 1534.0 nm (229 GHz FWHM bandwidth) as produced by configurations of the present invention. A CW signal at 1534.7 nm is added at the input to convert the frequency chirp into the chirped heterodyne beat 70. Also shown in FIG. 5 are the calculated oscillation frequencies 74 (shown as a series of black circles) for the adjacent minima in 70 and a linear fit 78 (shown as solid line) to match the positions of the maxima and minima so that the chirp can be determined. The pulse 70 recorded at the output had been temporally magnified by a factor of −30.09× and recorded on a high speed photo-receiver and an 8 GHz real time scope. The −3.45 GHz/ns chirped beat signal 70 recorded on the oscilloscope indicates an initial input with an optical frequency chirp of 312.9 GHz/100 ps. This is a 240 GHz bandwidth single shot measurement system that currently repeats at 990 KHz.

Figure 6:
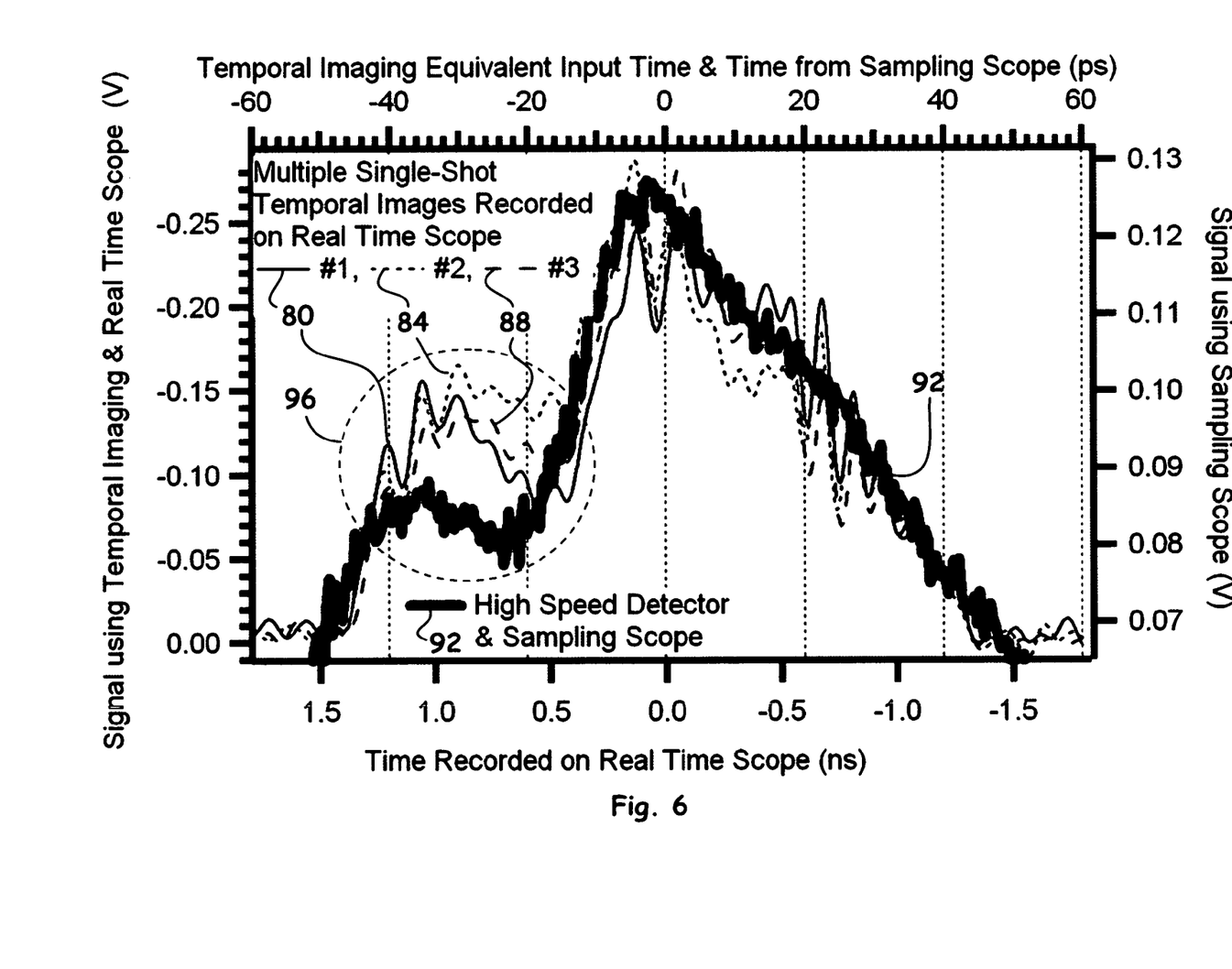
FIG. 6 show results for intensity of the pulse recorded single shot (3 separate measurements, 240 GHz bandwidth) in comparison to a time averaged measurement done with a sampling oscilloscope (40 GHz detector limited).

FIG. 6 show results for intensity of the pulse recorded single shot (3 separate measurements, 240 GHz bandwidth) in comparison to a time averaged measurement done with a sampling oscilloscope (40 GHz detector limited). In particular, this is a measurement of just the intensity profile (only the reference is off) when the heterodyne reference is turned off using the configuration, as shown in FIG. 4. Each trace (i.e., #1, #2, and #3, as denoted by reference numerals 80, 84, and 88 respectively) are obtained single-shot measurements (as referenced by the left vertical scale) as made approximately 30 seconds apart using an example temporal imaging magnification of −30.09×, a 12 GHz receiver, and a Tektronix TDS6804B 8 GHz scope having an effective Bandwidth of 240 GHz. The resultant data 80, 84, and 88 show fast temporal details and changes in the signal from pulse to pulse which can not be recorded with a sampling scope, as referenced by the right vertical scale. The heavy line trace 92 is a signal recorded on a repetitive, time averaged basis with a 40 GHz photodiode and 50 GHz sampling oscilloscope. The overall profile matches well. The sampling scope measurement was made later in the day and the circled region 96 level change is consistent with changes in the laser system (e.g., drift) that were observed. Again, the temporal imaging system measurements 80, 84, and 88, as referenced by the left vertical scale, show faster details and are each single shot measurements of one pulse, whereas the data 92 referenced by the right vertical scale is a repetitively averaged measurement of many pulses which blurs some of the faster details.

Figure 7:
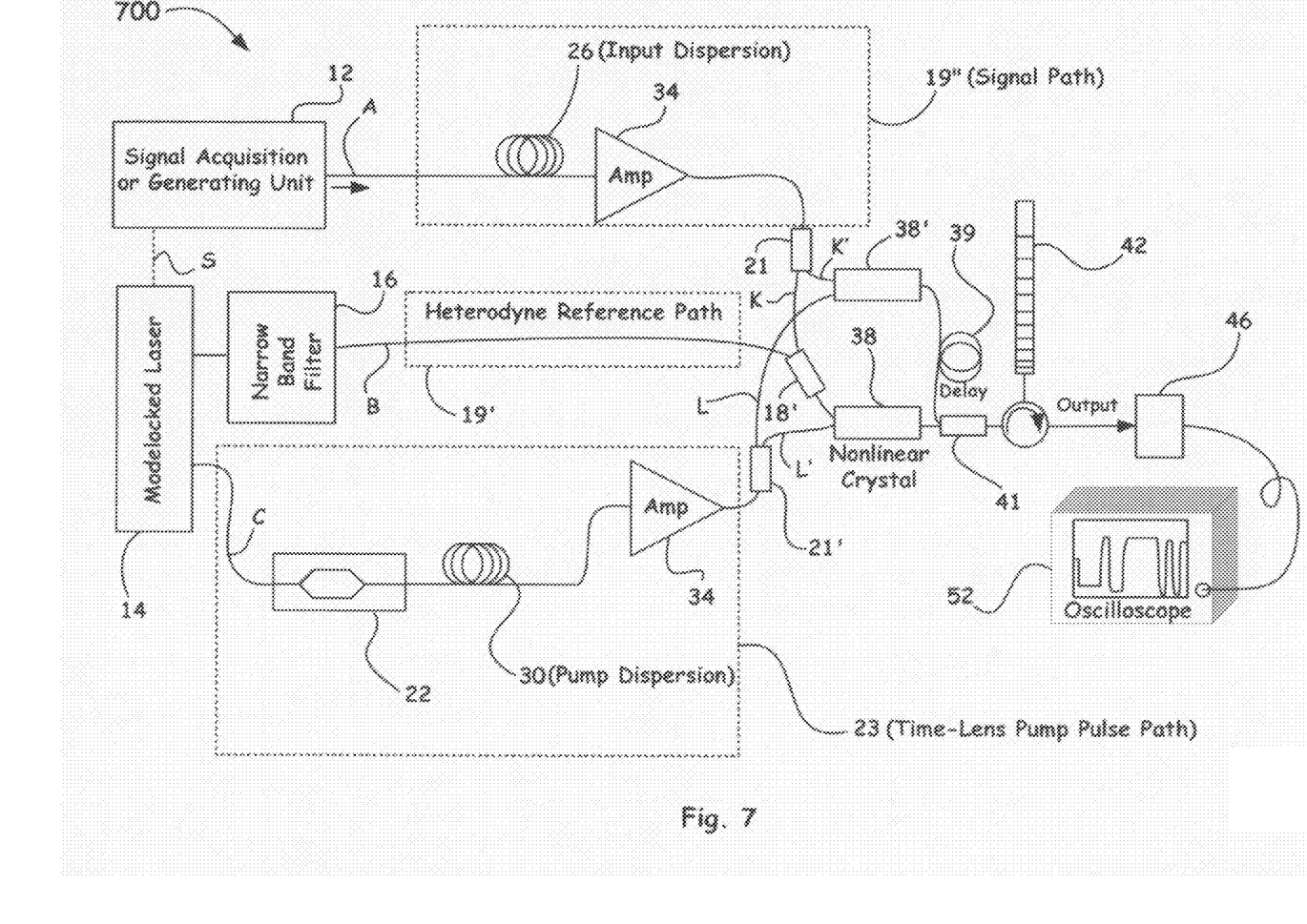
FIG. 7 shows an example diagram of a beneficial system of the present invention simultaneously recording both the time magnified heterodyne beat signal in FIG. 4 and a time magnified version of the intensity profile.

FIG. 7 shows another beneficial example system having input signal sensitivities from about 5 pJ down to about 5 fJ per 100 ps input frame (temporal field of view), or about 50 mW to 50 µW peak optical power. Such a system, designated generally by the reference numeral 700, is adapted to simultaneously record both the time magnified heterodyne beat signal, as discussed above and as shown in FIG. 4, and a time magnified version of the intensity profile. It is to be noted that common reference numbers denoted in FIG. 4 are utilized where similarly appropriate in FIG. 7.

For example, system 700 generally includes a signal generation or acquisition unit 12, an optical source 14, a pulse picker 22, as well as a first 26 and a second 30 optical dispersion element (such as, for example, a chirped fiber Bragg grating (used in reflection with an optical circulator or fiber coupler), or a prism or grating pair system. However, while such optical dispersive elements are beneficial, the present invention can also utilize any dispersive material that can induce the proper amount and kind of dispersion required for the present application, such as, for example, a configured pair of wound optical fibers to induce a predetermined dispersion effect.

System 700 also includes a pair of optical amplification means 34, such as, but not limited to, Erbium doped Fiber amplifiers, a nonlinear interaction optical device 38, such as, but not limited to, a periodically poled Lithium Niobate waveguide or an aperiodically poled lithium niobate (A-PPLN), an output dispersion means 42 (e.g., wound optical fiber, prism or grating pair systems, dispersive material, but often a chirped fiber Bragg gratings used in reflection with an optical circulator or fiber coupler, etc.), a detector 46, such as, for example, a photodiode, an amplified photoreceiver, a photomultiplier, a charge coupled device (CCD), etc., and/or any imaging device constructed to the design output parameters for system 700, and an analyzing means 52, such as a real-time oscilloscope, for analyzing the time magnified waveforms as received by detector 46. Other components can replace one or both of 46 and 52, such as optical streak cameras, with significant trade offs in the bandwidth, dynamic range, and repetition rate of the system.

Similar to the example configuration of FIG. 4, the signal generation or acquisition unit 12, as shown in FIG. 7, is configured to either receive a single-pulse transient signal or a number of such pulses or is configured to generate said waveform from the optical source 14. It may be configured to induce the received modulation onto a reference signal directed from optical source 14 (or directed from a separate independent source) via for example, an integrated-waveguide interferometric modulator (e.g., a LiNbO3 Mach-Zehnder modulator), or modulating sensor unit. It may also be designed to generate ultrafast arbitrary waveforms from said source 14, which require real-time measurement and verification as to their precision, accuracy, and stability. The optical source 14 itself is often designed to be a laser, often a mode-locked laser, arranged to output about 100 mW of average optical power and capable of outputting a wavelength range between about 1310 nm and up to about 1650 nm so as to also include the S, C, and L bands commonly utilized in the telecom industry. Many other wavelength bands may also be used. While a number of optical sources can be incorporated into the configuration of FIG. 7, a beneficial source includes a harmonically mode locked sigma laser lasing at 1534 nm at 620 MHz with output pulsewidths of down to about 1 ps. Another beneficial arrangement for the optical source 14 includes integration of an octave spanning carrier-envelope locked system currently under development at Massachusetts Institute of Technology (MIT). In such an arrangement, signal and pump pulses can be chosen from slightly shifted sections of the broadband laser.

As also similarly discussed above with reference to FIG. 4, source 14 in FIG. 7 shows one common source for improved stability but it is also possible for separate and varied types of sources to be used. For example, a narrow line-width (e.g., 1 MHz) Distributed Feedback laser (DFB) laser, or tunable single-longitudinal optical sources, such as, but not limited to, Distributed Bragg Reflectors, Sampled Grating DBRs, Grating-assisted Co-directional Couplers with Sampled Reflectors, and Vertical Cavity Surface Emitting Lasers capable of operating within the designed parameters of the present invention.

Turning exclusively to the beneficial configuration of FIG. 7, in the method of the invention, a desired waveform to be recorded (not shown) is generated by the signal generation or acquisition unit 12. It may be by way of the induced modulation of an electromagnetic radiation beam directed from optical source 14 or by an ultrafast modulation of an independent source. The induced modulated signal as produced from signal generation or acquisition unit 12 is directed along path A (i.e., shown with a directional arrow) and is further directed along the top leg denoted within a dashed box as Signal Path 19"). Signal path 19" can be referred to as the input dispersion path, which includes being directed through optical dispersive element 26 to induce a predetermined amount of dispersion into the directed signals received and thereafter, the signal having an induced input dispersion is amplified via amplifier 34 to make up for losses resulting from upstream elements.

The signal received form amplifier 34 is split into two paths (denoted as K and K') by a splitter 21, often a 50/50% splitter. One such split signal (K') is directed into a first time lens crystal 38', e.g., a periodically poled Lithium Niobate waveguide or an aperiodically poled lithium niobate (A-PPLN) waveguide. The second portion of the split signal (K) is received and further directed by a first coupler 18' into a second time lens crystal 38, e.g., a periodically poled Lithium Niobate waveguide or an aperiodically poled lithium niobate (A-PPLN) waveguide.

A middle path (i.e., Heterodyne Reference Path 19', as shown within a dashed portion) is configured to combine the signal received from a narrowband reference signal (often generated from optical source 14 in conjunction with a filtering means 16 (e.g., one or more narrow band filters, edge filters, long pass and short filters, etc.)) with a split portion (K) from one of the dispersed inputs as directed from the Signal Path 19" (i.e., after the input dispersion instead of before the input dispersion, as in FIG. 4) via an optical coupler 18', which can then be received by crystal 38 for producing a time lens output using the heterodyne reference path 19' signal.

The very bottom leg is the path of the chirped time lens pump pulse 23, as discussed above and as shown in FIG. 4, except that it is split along two paths (denoted as L and L' by splitter 21', often a 50/50 splitter) to drive the two mixing time lens crystals 38' and 38 respectively. The top crystal path (i.e., through crystal 38') produces the normal time lens output when there is no heterodyne reference and the bottom crystal (i.e., crystal 38) produces a time lens output for the case with the heterodyne reference. The signals are time delayed relative to each other, (e.g., via optical delay 39) so that they do not overlap and then go through a final coupler 41 and then a common output dispersion 42. Such an arrangement allows for the same input dispersion, output dispersion, and time lens pump to be used on both the temporal image of the signal and of the heterodyned signal. Thus, the magnifications are the same and any distortions are common to both.

Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The invention claimed is:

1. A time lensing method, comprising:
   providing a waveform to be recorded;
   providing a first signal from an optical source;
   filtering said first signal to produce a filtered signal;
   heterodyning said waveform with said filtered signal to produce a heterodyned signal;
   dispersing said heterodyned signal to produce a dispersed signal;
   dispersing a second signal from said optical source to produce a time lensed signal;
   combining said dispersed signal with said time lensed signal to produce a combined signal; and
   detecting said combined signal.

2. The method of clam 1, wherein said waveform is provided in a single pulse.

3. The method of claim 1, wherein said heterodyned signal is self-referenced to produce a self-referenced heterodyne beat signal by utilizing at least one of: a narrow band filtered spectrum and a single longitudinal mode of a source laser.

4. The method of claim 3, wherein said self-referenced heterodyne beat signal comprises an instantaneous frequency difference between said one or more desired signals to be recorded and said reference signal.

5. The method of claim 1, wherein said heterodyned signal comprises an instantaneous frequency difference between said one or more desired signals to be recorded and said reference signal.

6. The time lensing method of claim 3 or 4, further comprising measurement of heterodyne beat frequencies of up to 10 THz changing on about a 1 ps time scale.

7. The method of claim 1, wherein the step of combining said dispersed signal with said time lensed signal produce a combined signal is carried out with a non-linear crystal.

8. The method of claim 7, wherein said non-linear crystal comprises a quasi-phase matched waveguide device.

9. The method of claim 8, wherein said quasi-phase matched waveguide device is selected from the group consisting of a poled Lithium Niobate crystal and an aperiodically poled lithium niobate (A-PPLN) crystal.

10. The method of claim 1, wherein at least one of said dispersed signal and said time lensed signal are dispered with a device selected from the group consisting of an optical fiber, a non-linear crystal, a free space grating, a waveguide, an arrayed waveguide grating with feedback, a volume of dispersive material, an array of ring resonators, a Gires-Tournois interferometer (GTI), a fiber Bragg grating, and a planar waveguide Bragg grating.

11. The time lensing method of claim 1, wherein said combined signal comprises a quadratic time lens phase produced with coherent higher order processes.

12. The time lensing method of claim 11, wherein said coherent higher order processes comprise four wave mixing in a material with a $\chi^{(3)}$ nonlinearity such that $E_2 \propto \chi^{(3)} \cdot E_p E_p E_1^*$, where $E_2$ is the output, $E_p$ is the time lens pump, and $E_1^*$ is the complex conjugate of the input fields respectively.

13. The time lensing method of claim 11, wherein an output photon is generated from the sum of two or more time lens pump photons minus one signal photon.

14. The time lensing method of claim 11, wherein said combined signal comprises a frequency chirp larger than the chirp rate of said time lensed signal.

15. The time lensing method of claim 1, wherein said waveform comprises a signal carrier frequency that has been converted to another region of the electromagnetic spectrum.

16. The time lensing method of claim 15, wherein said signal carrier frequency comprises at least one electromagnetic band selected from: optical and THz frequencies.

17. The method of claim 11, wherein said dispersed signal comprises a dispersed THz input signal.

18. The method of claim 7, wherein said non-linear crystal comprises a material selected from the group consisting of GaSe, ZnGeP, GaP, LiNbO3, LiTaO3, PPLN, PPSLN, PPLT, PPSLT, KNbO3, LBO, BIBO, CLBO, KTP, GaAs, GaSe, ZnGeP and GaP.

19. The time lensing method of claim 1, wherein said second signal comprises at least one intensity profile selected from the group consisting of a flat top and a super-Gaussian, wherein distortions due to self-phase modulation are removed or minimized.

20. A time microscope, comprising:
a signal acquisition or generating unit for providing a waveform to be recorded;
an optical source for providing a first signal;
a filter configured for filtering said first signal to produce a filtered signal;
means for heterodyning said waveform with said filtered signal to produce a heterodyned signal;
first means for dispersing said heterodyned signal to produce a dispersed signal;
second means for dispersing a second signal from said optical source to produce a time lensed signal;
means for combining said dispersed signal with said time lensed signal produce a combined signal; and
a detector for detecting said combined signal.

21. The time microscope of claim 20, wherein said said means for combining comprises one or more non-linear crystals.

22. The time microscope of claim 21, wherein said one or more non-linear crystals comprise a quasi-phase matched nonlinear material.

23. The time microscope of claim 21, wherein said quasi-phase matched nonlinear material comprises at least one device selected from: a poled Lithium Niobate waveguide and an aperiodically poled lithium niobate (A-PPLN) waveguide.

24. The time microscope of claim 21, wherein said one or more non-linear crystals comprise utilizing at least one non-linear material selected from: GaSe, ZnGeP, GaP, LiNbO3, LiTaO3, PPLN, PPSLN, PPLT, PPSLT, KNbO3, LBO, BIBO, CLBO, KTP, GaAs, GaSe, ZnGeP, and GaP.

25. The time microscope of claim 20, wherein at least one of said first means for dispersing and said second means for dispersing comprise at least one dispersive element selected from: an optical fiber, a non-linear crystal, a free space grating, a waveguide, an arrayed waveguide grating with feedback, a predetermined volume of dispersive material, an array of ring resonators, a Gires-Tournois interferometer (GTI), a fiber Bragg grating and a planar waveguide Bragg grating.

26. The time microscope of claim 20, further comprising means for soliton compression of said time lensed signal.

27. The time microscope of claim 20, wherein said heterodyned signal comprises at least one self-referenced heterodyne beat signal.

28. The time microscope of claim 27, wherein said self-referenced heterodyne beat signal comprises an instantaneous frequency difference between said waveform and said first signal.

29. The time microscope of claim 20, wherein said first signal comprises using at least one of: a narrow band filtered spectrum and a single longitudinal mode of a source laser.

30. The time microscope of claim 20, wherein said heterodyned signal comprises an instantaneous frequency difference between said waveform and said first signal.

31. The time microscope of claim 20, wherein said time microscope is configured to measure said waveform with a resolution bandwidth of up to about 10 THz.

32. The time microscope of claim 20, wherein said optical source comprises a laser.

33. The time microscope of claim 32, wherein said laser comprises at least one source selected from: a mode-locked laser, an octave spanning carrier-envelope locked laser, a Distributed Feedback laser (DFB) laser, a Distributed Bragg Reflector, a Sampled Grating DBRs, and a Vertical Cavity Surface Emitting Laser.

34. The time microscope of claim 32, wherein said laser comprises a wavelength range between about 800 nm and up to about 2 micron.

35. The time microscope of claim 32, wherein said laser comprises a wavelength range between about 1310 nm and up to about 1650 nm so as to also include the S, C, and L telecommunication bands.

36. The time microscope of claim 20, wherein said second means for dispersing a second signal from said optical source to produce a time lensed signal comprises a pulse picker.

37. The time microscope of claim 36, wherein said pulse picker comprises at least one modulator selected from an electro-optic modulator and an acousto-optic modulator.

38. The time microscope of claim 36, wherein said pulse picker comprises a Mach Zehnder modulator.

39. A method, comprising:
providing a waveform to be recorded;
dispersing said waveform to produce a dispersed waveform;
providing a first signal from an optical source;
filtering said first signal to produce a filtered signal;
heterodyning said dispersed waveform with said filtered signal to produce a heterodyned signal;
dispersing a second signal from said optical source to produce a time lensed signal;
combining, in a first nonlinear crystal, said heterodyned signal with said time lensed signal to produce a first combined signal;
combining, in a second nonlinear crystal, said heterodyned signal, said filtered signal and said time lensed signal to produce a second combined signal;
combining said first combined signal and said second combined signal to produce a third combined signal; and
detecting said third combined signal.

* * * * *